H. M. WILCOX.
APPARATUS FOR RECOVERING COPPER FROM ITS ORES.
APPLICATION FILED AUG. 28, 1909.
1,066,968.
Patented July 8, 1913.
3 SHEETS—SHEET 1.
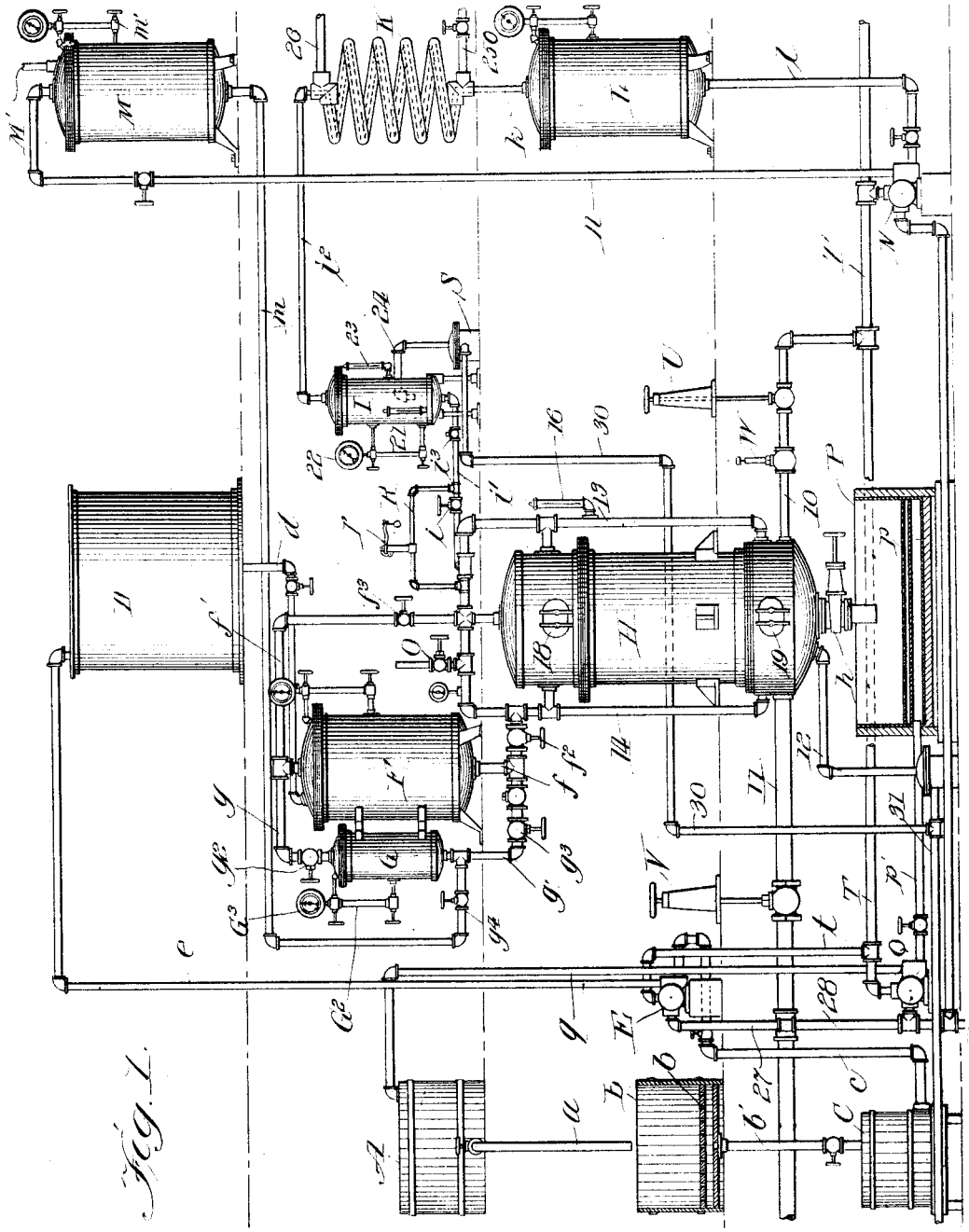

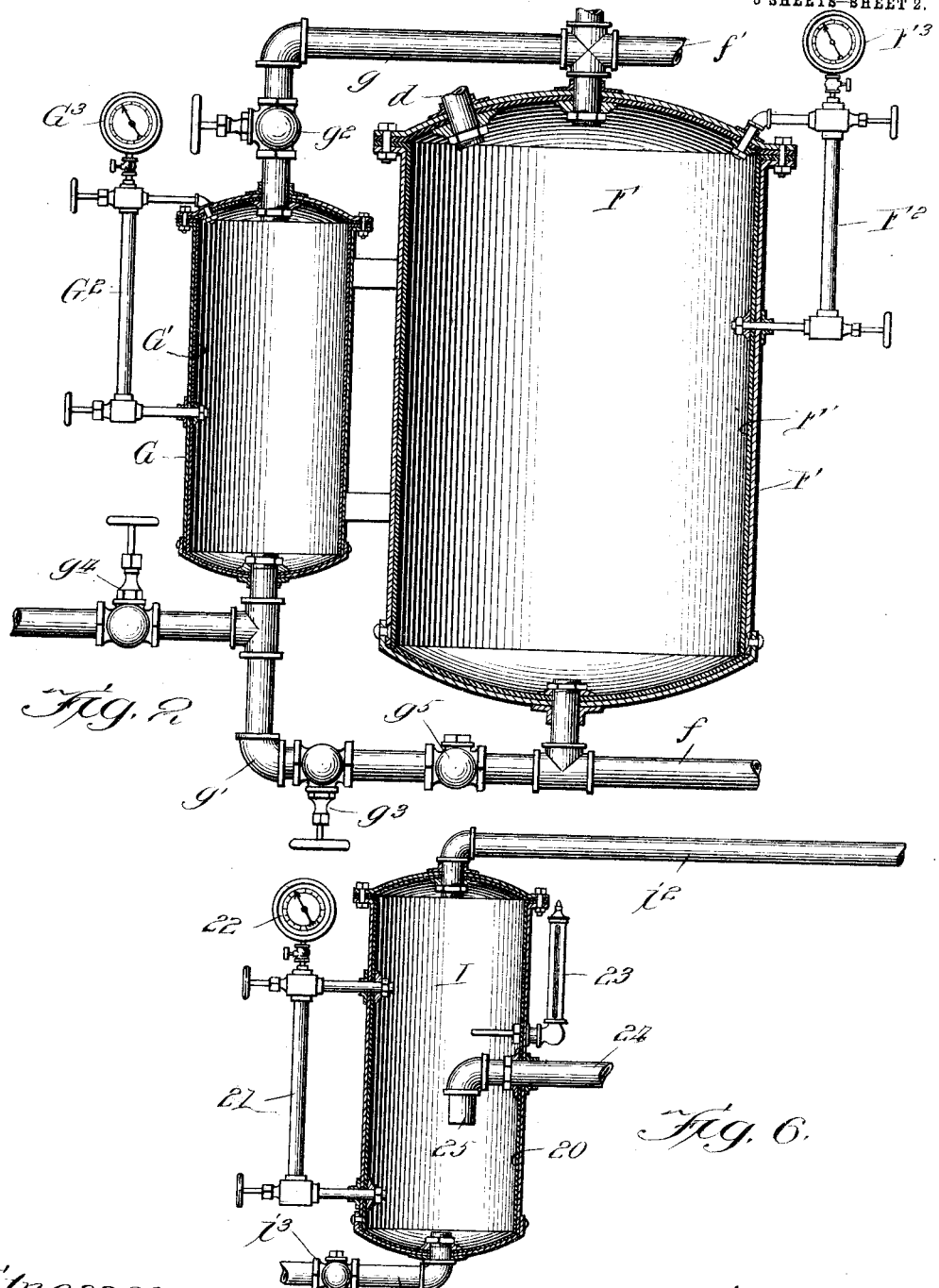

H. M. WILCOX.
APPARATUS FOR RECOVERING COPPER FROM ITS ORES.
APPLICATION FILED AUG. 28, 1909.
1,066,968.
Patented July 8, 1913.
3 SHEETS—SHEET 3.
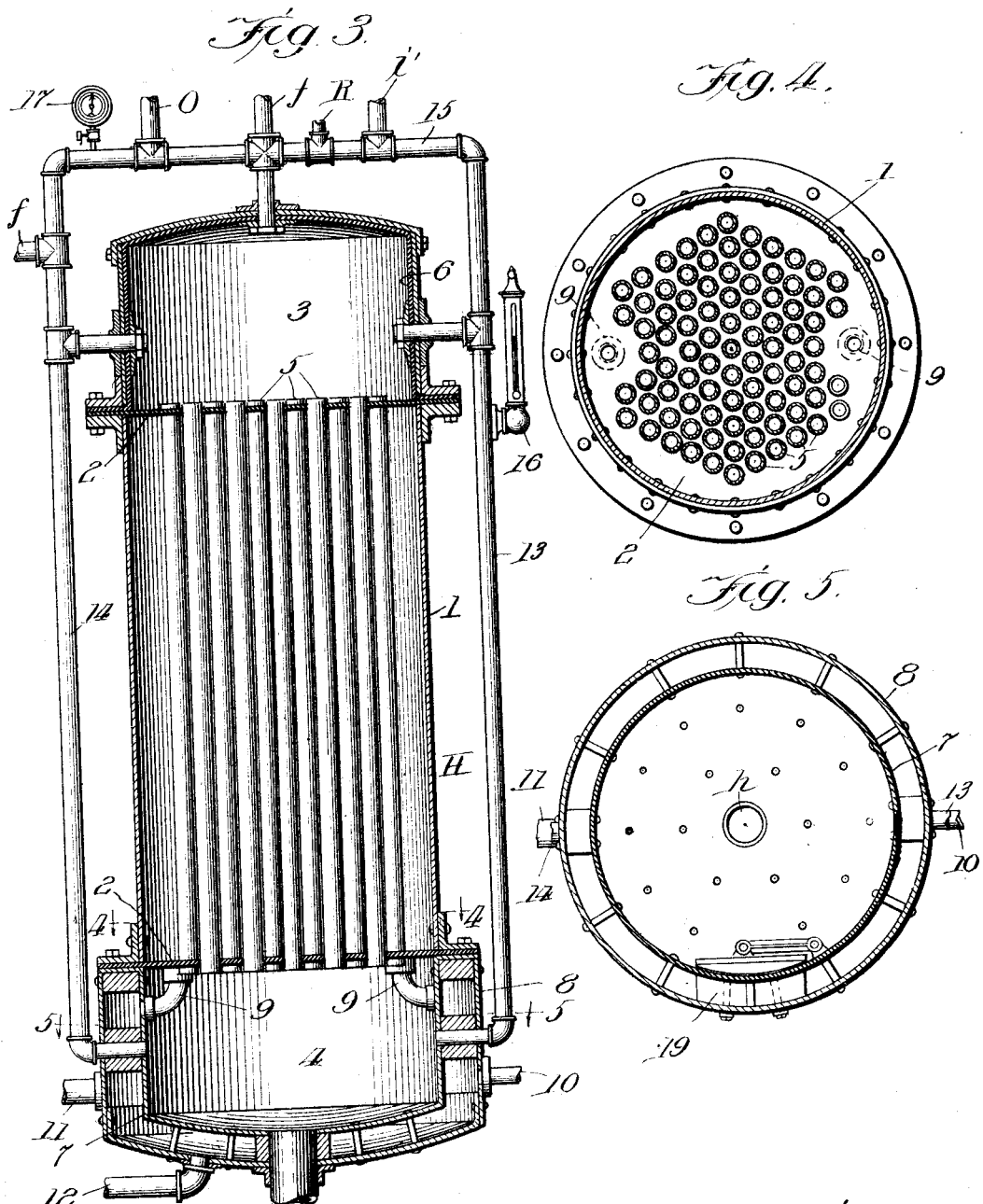
Witnesses:
H. S. Gaither
J. M. Smith
Inventor:
H. M. Wilcox
by Chamberlin & Freudenreich
attys

UNITED STATES PATENT OFFICE.

HENRY M. WILCOX, OF CHICAGO, ILLINOIS.

APPARATUS FOR RECOVERING COPPER FROM ITS ORES.

1,066,968.   Specification of Letters Patent.   Patented July 8, 1913.

Application filed August 28, 1909. Serial No. 515,033.

*To all whom it may concern:*

Be it known that I, HENRY M. WILCOX, a citizen of the United States, residing at Chicago, county of Cook, State of Illinois, have invented a certain new and useful Improvement in Apparatus for Recovering Copper from Its Ores, and declare the following to be a full, clear, and exact description of the same, such as will enable others skilled in the art to which it pertains to make and use the same, reference being had to the accompanying drawings, which form a part of this specification.

In my prior Patent, No. 12,815, reissued June 16, 1908, I have set forth a method of recovering copper in a metallic state from its ores. By that method the copper which is recovered is in a finely divided, flaky or powdered state, the particles being fine so as to be easily held in suspension in liquids and carried away. Moreover, the fine particles have no capacity for adhering together so that the copper must either be placed in sacks for shipment or must be melted and cast into ingots.

The principal object of the present invention is to make provision for the recovery of copper in a pure state and in such condition that it may be formed into a block or brick by simply applying pressure.

A further object of my invention is to provide a novel method for effectively recovering copper from its ores.

A further object of my invention is to provide a novel apparatus for carrying out my improved method.

The various features of novelty whereby my invention is characterized will hereinafter be pointed out with particularity in the claims; but, for a full understanding of my invention and of its various objects and advantages, reference may be had to the following detailed description taken in connection with the accompanying drawings, wherein:

Figure 1 is a view partly in section and partly in elevation, showing a preferred arrangement of my improved apparatus; Fig. 2 is a sectional view showing on an enlarged scale the absorption tank and the container or measuring receptacle for the fluid to be absorbed; Fig. 3 is a vertical section taken through the precipitating tank; Fig. 4 is a section taken on line 4—4 of Fig. 3; Fig. 5 is a section taken on line 5—5 of Fig. 3; and Fig. 6 is a section through the separator or trap connected with the precipitating tank or boiler.

In the process disclosed in my aforesaid patent a neutral solution of copper sulfate is impregnated with sulfur dioxid gas and the solution is then heated while under pressure. While this process results in the precipitation of metallic copper, the form in which the copper is left is objectionable, the copper being extremely fine and there being no coherence between the particles of the precipitated mass. I have discovered that by increasing the amount of sulfur dioxid a change in the form of the precipitated copper takes place and that a point can be reached where the mass of precipitated copper has a mossy or fibrous appearance, there being such an interlocking or interlacing of the various parts of the mass that the whole will adhere together so as to produce a solid brick upon the application of pressure. Consequently copper recovered in this way can be placed in condition for shipment by simply passing it through presses and without requiring the use of sacks to contain it or the application of heat to reduce it to a coherent mass. I have found that the precipitated copper assumes a distinct mossy appearance when the weight of the sulfur dioxid which is absorbed is approximately equal to the weight of the metallic copper in the solution, the coherence of the various particles increasing, within limits, with an increase in the amount of the sulfur dioxid used. In order to cause a copper sulfate solution having a density sufficient to make the process commercially practicable, to absorb the desired amount of the dioxid, it is necessary that the dioxid be in the form of a liquid or at least in a state, if it be a gas which has been produced by burning sulfur or roasting materials containing sulfur, free from nitrogen. When it is in the form of a liquid, absorption takes place very quickly and, in fact, almost immediately, upon introducing the dioxid into the sulfate solution. When the dioxid is in a gaseous form the rate of absorption depends upon the pressure under which it is introduced and maintained, the absorption taking place faster as the pressure is increased until the pressure which will produce liquefaction is reached.

I prefer to introduce the dioxid in a liquid state since this makes it easy to supply the dioxid in measured quantities and shortens and otherwise facilitates the absorption operation. In the drawings I have illustrated a system in which the dioxid is introduced into the absorption tank in liquid form, and I shall limit the detailed description to this style of apparatus, although I intend to cover all forms of apparatus embodying the principles of my invention regardless of whether the sulfur dioxid is introduced as a liquid or as a gas.

The various features of my improved method as well as of the apparatus will be more clearly understood from a detailed description of the method as carried out in connection with the apparatus, and I shall therefore confine myself to a single description covering both aspects.

In carrying out my invention I begin with a neutral solution of copper sulfate produced in any suitable way, the present invention being confined to no particular process or apparatus for producing the sulfate. In order to make the system complete, however, I have shown conventionally means for producing sulfate.

Referring to the drawings, A represents a tank or reservoir adapted to contain sulfuric acid.

B is a tank or reservoir having a perforated, false bottom $b$, this tank being adapted to receive and contain crushed ore. C is a sump. These tanks are shown as arranged one below the other so that the sulfuric acid may flow by gravity from the reservoir A into the reservoir B through a pipe $a$; the copper sulfate in turn flowing by gravity to the sump through a pipe $b^1$. From the sump the sulfate is pumped into a tank or reservoir D by means of a pump E, the suction side of the pump being connected to the sump through the pipe $c$ and the discharge to the receiving reservoir through pipe $e$. F is an absorption tank preferably located beneath the reservoir D so that the sulfate solution may flow into the absorption tank as required through a pipe $d$. Arranged adjacent to the absorption tank is a measuring receptacle G, the purpose of which is to supply sulfur dioxid to the absorption tank when and in the quantities desired. In the arrangement shown, there are pipes $g$ and $g^1$ which connect together respectively, the upper and lower ends of the vessels F and G. Communication through these pipes is controlled by valves $g^2$ and $g^3$ respectively. It will be seen that if the valve $g^3$ is open while the receptacle G contains liquid dioxid, the dioxid will be forced into the bottom of the absorption tank in liquid form; while, if the valve $g^3$ is closed and the valve $g^2$ opened, the dioxid will enter the top of the absorption reservoir in gaseous form. Beneath the absorption tank is arranged a precipitating boiler H into which the sulfate solution with its charge of sulfur dioxid is caused to flow from the absorption reservoir. I prefer to arrange two connections between the absorption tank and the precipitating boiler in order that the contents of the absorption tank may be transferred to the precipitating boiler under pressure at a time when the pressure within the precipitating boiler is simply that of atmosphere. To this end I lead a pipe $f$ from the bottom of the absorption tank and another pipe $f^1$ from the top, these two pipes leading into the precipitation boiler at any desired point. Connection through these pipes is controlled by means of valves $f^2$ and $f^3$, both of these valves being closed while the absorption reservoir is being charged. When it is desired to transfer the contents from the absorption reservoir to the precipitating tank, both of the valves are opened and the liquid flows through one of the pipes and an equalization of pressure is effected through the other, the pressure being at all times maintained and there being no loss of gaseous dioxid since any gaseous dioxid which remains in the absorption tank will be absorbed by the next charge of sulfate solution.

The precipitation boiler is preferably made larger than the absorption tank in order that the absorption tank may be filled entirely with the sulfate solution and discharged into the precipitation boiler without filling the latter, it being necessary in carrying out my invention that a considerable empty space be left within the precipitation boiler. This space is required for the purpose of receiving the surplus dioxid which is given up in gaseous form when heat is applied. If no space were provided above the liquid, the surplus dioxid would remain distributed throughout the liquid producing chemical reactions which would cause the precipitate to contain compounds of copper in addition to copper in a pure metallic state. The amount of free space required varies with the excess of dioxid employed and the pressure which it is desired to obtain in the precipitating boiler, a free space of 10 or 15 per cent. of the total capacity of the boiler being sufficient in some cases while in others it is necessary to have a free space equal to 20 to 25 per cent. of the capacity of the boiler. After the contents of the boiler have been heated sufficiently a valve $i$ in a pipe $i^1$ extending between the top of the boiler and a trap I is opened and the compressed dioxid gas passes from the free space or dome in the top of the boiler to the trap I and thence through a pipe $i^2$ to a cooler K. The cooler is shown as an ordinary refrigerating coil which causes the temperature of the hot gas to be lowered sufficiently to enable the gas to liquefy under the pressure of the system.

From the condensing coil the liquid dioxid flows into a chamber L through a pipe $k$. From the chamber L the liquid dioxid is pumped into an elevated reservoir M by means of a pump N, the suction side of which is connected to the bottom of the chamber L by means of the pipe $l$ and the discharge side of which is connected with the reservoir M through a pipe $n$. From the bottom of the reservoir M extends a pipe $m$ which is connected with the measuring receptacle G. When the contents of the boiler are heated the escaping dioxid raises into the upper part of the free space or dome of the boiler and the water vapor or steam which is formed produces a layer between the top of the liquid and the dioxid. Consequently when the valve $i$ is open, substantially pure dioxid is given off. When the pressure has fallen to 20 pounds or so in the boiler substantially all of the free dioxid has escaped and the steam may then be vented through an exhaust valve O. After the free dioxid has been recovered the contents of the boiler may be discharged into a tank P through a valve outlet $h$. The tank P is preferably provided with a perforated false bottom $p$ which serves to filter the metallic copper from the sulfuric acid and the spent solution.

The copper may be removed from the tank in any suitable way and the liquid be again pumped into the tank A by means of a pump Q whose inlet side is connected to the tank P beneath the false bottom by means of a pipe $p^1$ and whose discharge side is connected with the tank A by means of a pipe $q$.

I have found that the best results are obtained by raising the temperature in the boiler from 260 degrees to 300 degrees F., obtaining a pressure in the neighborhood of 110 pounds. It is only necessary to bring the temperature to the desired point without maintaining it for any considerable time thereafter. Of course, the longer the high temperature is maintained the greater will be the percentage of the copper in the solution which is precipitated; but, since the spent liquids are returned to the starting point and used over again, it is immaterial whether or not the largest possible amount of copper has been extracted at any one time. After the heating operation has been performed and the gaseous dioxid and steam withdrawn, the contents of the boiler may be discharged and a new charge of material be introduced.

At the temperature of 260 degrees it will be found that the precipitated copper is in a very satisfactory condition for formation into bricks and, as the temperature is increased, the coarseness of the fiber in the mass will be increased; it being therefore simply a matter of choice whether the minimum or the maximum temperatures are employed.

In order to prevent the pressure in the boiler from becoming too great I prefer to arrange a by-pass R about the valve $i$, this by-pass containing a suitable safety valve $r$. The safety valve is set to operate at the desired pressure and when this is exceeded some of the gaseous dioxid flows through the by-pass and into the trap, thereby relieving the pressure within the system. This by-pass, of course, does not interfere with the normal operation of exhausting the dioxid from the boiler.

During the process more sulfuric acid is produced than is required so that the supply of acid need not be replenished. It is only necessary, therefore, to maintain a sufficient supply of dioxid since all of the dioxid is not recovered. The reservoir M may be provided with a suitable gage $m^1$ showing the level of the liquid therein and, as this level falls, more dioxid may be introduced from any suitable source through an intake pipe $M^1$.

In Fig. 2 I have shown the absorption tank and the measuring receptacle on an enlarged scale. Each of these may consist of a headed sheet steel cylinder lined with lead, the linings being indicated at $F^1$ and $G^1$, respectively. Each is provided with a gage for showing the liquid level, the gages being indicated at $F^2$ and $G^2$, respectively. Pressure gages $F^3$ and $G^3$ may be mounted upon the upper ends of the gages $F^2$ and $G^2$, respectively. A valve $g^4$ may be arranged in the intake pipe $m$ near the measuring receptacle, while in the pipe $q^1$ I arrange a check valve $q^5$. The check valve permits the flow of fluid from the measuring receptacle and the absorption tank but prevents a flow in the opposite direction. It will be seen that by properly proportioning the members F and G, sulfate solution can be led into the former until a predetermined level is reached, while the other is filled to a predetermined level with liquid dioxid. The entire charge of the measuring receptacle may then be transferred to the absorption tank in the manner previously described, so that the proper proportions may always be maintained between the copper in the solution and the sulfur dioxid without making it necessary for a skilled operator to be present. As I have previously stated, I found that the mossy character of the precipitated copper increases with the amount of sulfur dioxid absorbed in the solution and, if the weight of the sulfur dioxid absorbed is approximately equal to the weight of the copper contained in the solution the fibrous character of the precipitated mass is such that the mass can very easily be compressed into a hard, firm brick; but it will, of course, be understood that I do not desire to be limited to any exact proportions since more or less dioxid may be employed, within limits, without changing the character of the precipitate except in degree.

In Figs. 3 to 5 I have illustrated a preferred form of precipitation boiler. It is necessary to have a boiler which will be strong enough to withstand the requisite pressures; which will not be destroyed through chemical reactions between it and its contents; in which there is a large distributed heating surface; which will not become leaky under the constant stresses to which it is subjected by reason of alternate heating and cooling; and in which the dioxid gas which is set free is prevented from being pocketed in the solution. In order to produce a boiler having all of these requirements, I prefer to make a cylindrical steel body 1, having its ends closed by copper sheets 2, arranged in the form of diaphragms and having also a dome 3, secured upon the upper end and a chamber 4, on the lower end. Extending between the two heads are a series of brass tubes 5, which open at their ends into the chambers 3 and 4, respectively. The dome 3 is provided with a lead lining 6. The walls of the chamber 4 are made double, there being an inner wall 7 and an outer wall 8. The space between the walls 7 and 8 is connected to the space surrounding the brass tubes by means of conduits 9. Steam pipes 10 and 11 lead to the space between the walls of the chamber 4, and when steam is supplied to these pipes it enters this space and passes up and around the brass tubes, thereby providing an extended heating surface distributed throughout the boiler. A waste pipe 12 extends through the wall 8 so that the water of condensation may be led off. I prefer to make the wall 7 of copper. In order to prevent the central portion of the liquid contained within the chamber 4 from remaining cool, and also for the purpose of preventing pocketing of the freed dioxid gas in the chamber I provide means for producing a circulation from the chamber 4 to the top of the boiler. To this end I connect the lower ends of a pair of tubes 13 and 14 with the chamber and connect the upper ends of these tubes with the dome 3 at or below the working level of the solution in the boiler. Consequently when the contents of the boiler are heated a free circulation takes place between the chambers 3 and 4 through the pipes 13 and 14 and the tubes 5. This not only makes provision for heating the solution uniformly throughout but it also serves to prevent pocketing of the gases in the bottom of the boiler. For convenience of construction, the pipes 13 and 14 may be extended above the boiler and be connected by means of a horizontal pipe 15, this latter pipe communicating with the pipe $f^1$ and also with the pipe $i^1$. The pipe 14 may be connected directly with the pipe $f$. 16 is a thermometer which may conveniently be placed on the pipe 13 so as to show the temperature of the solution. A pressure gage 17 may be placed at any suitable point as, for example, on the pipe 15, in order that the pressure within the boiler may be observed. If desired, hand holes 18 and 19 may be formed in the walls of the chamber 4 and of the dome 3, as indicated in Fig. 1, in order to afford entrance to the interior of the boiler.

In Fig. 6 I have shown on an enlarged scale the trap I. This may conveniently consist of a closed steel cylinder having a lead lining 20, the pipe $i^1$ leading into the bottom thereof and the pipe $i^2$ leading from the top. I prefer to place a check valve $i^3$ in the pipe $i^1$ for the purpose of preventing back flow of the fluids. 21 and 22 indicate a water gage and a pressure gage respectively and 23 is a thermometer. Extending into the trap between the ends thereof is a pipe 24 having a downwardly extending portion 25 on its inner end. This pipe leads to a trap S and serves to carry away accumulated water after it rises above a predetermined level. By arranging the trap I between the precipitation boiler and the condenser any liquid which is discharged from the boiler due to priming is caught in the trap and led away so that only dioxid gas reaches the cooler or condenser. The cooling medium for the condenser is supplied through a pipe 250 and is discharged through a pipe 26. Any desired cooling medium may be employed, but ordinary cool water from wells or mountain streams will answer the purpose since the dioxid will liquefy under the pressure in the system at a fairly high temperature. The steam pipe 10 may be connected to a main steam conduit T which supplies steam to the pumps N and Q and also to the pump E through a branch $t$. The steam pipe 11 may be one which receives the exhaust from the pumps, the exhaust from the pump E being conducted thereto through pipe 27, the exhaust from pump Q being conducted thereto through pipe 28, and the exhaust side of pump N being connected to pipe 28 through pump 29. A pipe 30 leading from the trap S and a pipe 12 leading from the steam space in the precipitation boiler both empty into a waste pipe 31 which may be connected to a sewer. The admission of steam to the boiler through the pipe 10 is controlled by a valve U while the admission through pipe 11 is controlled by a second valve V. W is a reducing valve which may be placed in the pipe 10 for causing the steam pressure to be reduced to a proper degree. It will now be seen that I have produced a simple and novel method of treating a copper sulfate solution so as to produce a novel product, namely a mass of copper in which the particles are so interlaced that the whole may be conducted into a solid brick by pressure. Furthermore, my method may be practised by unskilled laborers if they are intelligent enough to follow a few simple instructions. It will further be seen that I have provided a simple and effective apparatus for carrying out my novel method; one in which there is no waste; and one which will enjoy a long life under the most severe working conditions.

In order to make processes of this general nature commercially practicable it is necessary that the percentage of copper in the sulfate solution be fairly high. The only limit which is placed upon the density of the copper sulfate solution which may be successfully treated in accordance with my invention is that which is imposed by the crystallization point of the copper sulfate; and, therefore, it is feasible to work with solutions containing as high as 6 per cent. of metallic copper. If the copper sulfate did not crystallize when the percentage of copper in the solution reached 6 or 7 per cent., it would be possible to work with solutions having a still greater proportion of copper since the amount of sulfur dioxid which the solution can be made to absorb in accordance with my invention is limited only by the crystallization point of the copper sulfate.

While I have gone into great detail in order to explain clearly what I deem the preferred method and preferred form of apparatus, I do not desire to be limited to any particular method or apparatus, to the use of liquid sulfur dioxid or to the use of any particular reagent which performs the functions which I have attributed to the sulfur dioxid; but I intend to cover all forms or variations of my improved method and apparatus which fall within the definitions of my invention constituting the appended claims.

What I claim as new and desire to secure by Letters Patent is:

1. In an apparatus for recovering copper, an absorption tank, a containing and measuring tank for a chemical agent, conduits connecting together the tops and the bottoms of said tanks, and valves in said conduits.

2. In an apparatus for recovering copper, an absorption tank, a boiler, conduits leading from the top and bottom of said tank to said boiler, and valves controlling said conduits.

3. In an apparatus for recovering copper, an absorption tank, a containing and measuring tank, a boiler, conduits connecting together the tops and the bottoms of said tanks, conduits extending respectively from the top and the bottom of said absorption tank to the boiler, and a valve in each of said conduits.

4. A precipitating boiler comprising a closed shell and a plurality of circulation tubes arranged outside of the shell and connected at their upper and lower ends respectively with the upper and lower ends of the boiler.

5. A precipitating boiler comprising a cylindrical body portion, sheets closing the ends of said body portion, open-ended tubes extending between and secured to said sheets, a dome secured upon the upper end of said body portion so as to form with one of said sheets a gas chamber, a double-walled chamber secured to the lower end of said body portion, there being connecting passages between the space surrounding said tubes and the space between the double walls of the latter chamber.

6. A precipitating boiler comprising a cylindrical body portion, a dome at one end thereof, a settling chamber at the other end thereof, said body portion being separated from said dome and said settling chamber by transverse copper sheets, open-ended brass tubes extending between and secured to said sheets, a lead lining for said dome, the settling chamber having an outer wall and an inner wall separated from the outer wall and made of copper, and there being passages leading from the space around said tubes to the space between said walls.

7. A precipitating boiler comprising a cylindrical body portion, a dome at one end thereof, a settling chamber at the other end thereof, said body portion being separated from said dome and said settling chamber by transverse copper sheets, open-ended brass tubes extending between and secured to said sheets, a lead lining for said dome, the settling chamber having an outer wall and an inner wall separated from the outer wall and made of copper, and there being passages leading from the space around said tubes to the space between said walls, and means for supplying steam to one of said spaces.

8. A precipitating boiler comprising a cylindrical body portion, a dome at one end thereof, a settling chamber at the other end thereof, said body portion being separated from said dome and said settling chamber by transverse copper sheets, open-ended brass tubes extending between and secured to said sheets, a lead lining for said dome, the settling chamber having an outer wall and an inner wall separated from the outer wall and made of copper, and there being passages leading from the space around said tubes to the space between said walls, and a plurality of conduits arranged outside of said boiler and opening at their one end into said dome and at their other end into said settling chamber.

9. In an apparatus for recovering copper, an absorption tank, a measuring and containing tank, a boiler, conduits connecting together the tops and bottoms of said tanks, a conduit connecting said absorption tank with said boiler, and a valve in each of said conduits.

10. A precipitating boiler comprising a closed shell, transverse partitions extending across the shell near the ends thereof, so as to form at one end a dome and at the other end a settling chamber, open ended tubes extending between and secured at their ends to said partitions so as to connect the settling chamber with said dome, and a circulating tube arranged outside of the shell and connected at its ends respectively with the dome and with the settling chamber.

11. A precipitating boiler comprising a closed shell, partitions dividing said shell into three compartments, conduits extending through the intermediate compartment and connecting the two end compartments together, and a conduit arranged outside of the shell and having its ends connected with the two extreme compartments.

12. A precipitating boiler comprising a closed shell, partitions dividing said shell into three compartments, conduits passing through the intermediate compartment and opening at their ends into the two end compartments, the wall inclosing one of said end compartments being made hollow, and a conduit connecting the interior of said hollow wall with the intermediate compartment.

13. A precipitating boiler comprising a closed shell, partitions dividing said shell into three compartments, conduits passing through the intermediate compartment and opening at their ends into the two end compartments, the wall inclosing one of said end compartments being made hollow, and a conduit connecting the interior of said hollow wall with the intermediate compartment, and means for supplying heating medium into the interior of said hollow wall.

14. A precipitating boiler comprising a closed shell, partitions dividing said shell into three compartments, conduits passing through the intermediate compartment and opening at their ends into the two end compartments, the wall inclosing one of said end compartments being made hollow, and a conduit connecting the interior of said hollow wall with the intermediate compartment, and means for supplying heating medium into the interior of said hollow wall, and a conduit arranged outside of the shell and having its ends opening into the two end compartments.

15. In an apparatus for recovering copper, an absorption tank, a containing and measuring tank, a boiler, a condenser, a conduit connecting said containing and measuring tank with said absorbtion tank, a conduit connecting said absorption tank with said boiler, a conduit connecting said boiler with said condenser, a conduit connecting said condenser with said measuring and containing tank, and a valve in each of said conduits.

16. In an apparatus for recovering copper, an absorption tank, a containing and measuring tank, a boiler, a condenser, a conduit connecting said containing and measuring tank with said absorption tank, a conduit connecting said absorption tank with said boiler, a conduit connecting said boiler with said condenser, a conduit connecting said condenser with said measuring and containing tank, a manually operated valve in each of said conduits, a by-pass around the valve in the conduit between the boiler and the condenser, and an ordinary pressure valve arranged in said by-pass.

17. In an apparatus for recovering copper, an absorption tank, a boiler, conduits arranged on opposite sides of said boiler, connections between the upper and lower end of the boiler and said conduits, a pipe leading from the upper end of said absorption tank and connected with the upper ends of both of said conduits, and a pipe leading from the lower end of said absorption tank and connected with the upper end of one of said conduits.

18. In an apparatus for recovering copper, an absorption tank, a containing and measuring tank, conduits connecting together the tops and bottoms of said tanks, manually operated valves in said conduits, and a check valve arranged in the conduit connecting the bottoms of said tanks together and arranged to prevent a flow from the absorption tank to the other tank.

19. In an apparatus for recovering copper, an absorption tank, a containing and measuring tank for sulfur dioxid, a boiler, a condenser for sulfur dioxid, a storage reservoir for sulfur dioxid, a conduit connecting the absorption tank with the boiler, a conduit connecting the boiler with the condenser, a conduit connecting the reservoir for sulfur dioxid with the containing and measuring tank, a valve in each of said conduits, and means for transferring sulfur dioxid from said condenser to said reservoir.

In testimony whereof, I sign this specification in the presence of two witnesses.

HENRY M. WILCOX.

Witnesses:
 WM. F. FREUDENREICH,
 H. S. GAITHER.